(12) United States Patent
Chang et al.

(10) Patent No.: US 12,100,294 B2
(45) Date of Patent: Sep. 24, 2024

(54) ELECTRONIC DEVICE AND METHOD FOR NAVIGATING PEDESTRIAN

(71) Applicant: HON HAI PRECISION INDUSTRY CO., LTD., New Taipei (TW)

(72) Inventors: Yueh Chang, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 345 days.

(21) Appl. No.: 17/580,132

(22) Filed: Jan. 20, 2022

(65) Prior Publication Data

US 2022/0230535 A1 Jul. 21, 2022

(30) Foreign Application Priority Data

Jan. 20, 2021 (CN) .......................... 202110077881.7

(51) Int. Cl.
*G08G 1/005* (2006.01)
*G01C 21/34* (2006.01)
*G06T 7/70* (2017.01)
*G06T 7/73* (2017.01)
*G06V 10/26* (2022.01)
*G06V 10/44* (2022.01)
*G06V 10/764* (2022.01)
*G06V 10/82* (2022.01)
*G06V 20/52* (2022.01)
*G06V 40/10* (2022.01)
*H04N 7/18* (2006.01)

(52) U.S. Cl.
CPC ......... *G08G 1/005* (2013.01); *G01C 21/3415* (2013.01); *G06T 7/70* (2017.01); *G06T 7/74* (2017.01); *G06V 10/26* (2022.01); *G06V 10/44* (2022.01); *G06V 10/764* (2022.01); *G06V 10/82* (2022.01); *G06V 20/52* (2022.01); *G06V 40/10* (2022.01); *H04N 7/188* (2013.01); *G06T 2207/30196* (2013.01); *G06T 2207/30241* (2013.01); *G06V 2201/07* (2022.01)

(58) Field of Classification Search
CPC . G08G 1/005; G06T 7/74; G06T 7/70; G06V 20/52; G06V 40/10; G06V 10/82; G06V 10/44; G06V 10/26; G06V 10/764; G01C 21/3415; H04N 7/188
USPC ....................................................... 348/143
See application file for complete search history.

(56) References Cited

U.S. PATENT DOCUMENTS

2020/0064141 A1* 2/2020 Bell ...................... G09B 21/006
2020/0152051 A1* 5/2020 Morimura .............. G08G 1/005

* cited by examiner

*Primary Examiner* — Sath V Perungavoor
*Assistant Examiner* — Kristin Dobbs
(74) *Attorney, Agent, or Firm* — ScienBiziP, P.C.

(57) ABSTRACT

A method for navigating a pedestrian, implemented in an electronic device, includes, capturing images of an environment of a road around the pedestrian at preset time intervals in response to a navigation request from a mobile device carried by the pedestrian, and determining whether at least one first obstacle exists on a path of the pedestrian according to the captured images. Other pedestrians may be recognized in each image, and a movement track of the other pedestrian may be determined. Determine whether at least one second obstacle exists on the road and determine that at least one second obstacle exists on the road if the other pedestrian is deviating from a single direction. An obstacle avoidance prompt is sent to the mobile device if first obstacle and/or second obstacle exist on the road.

14 Claims, 6 Drawing Sheets

ELECTRONIC DEVICE AND METHOD FOR NAVIGATING PEDESTRIAN

CROSS-REFERENCE TO RELATED APPLICATIONS

This application claims priority to Chinese Patent Application No. 202110077881.7 filed on Jan. 20, 2021, in China National Intellectual Property Administration, the contents of which are incorporated by reference herein.

FIELD

The subject matter herein generally relates to navigation, and particularly to an electronic device and a method for navigating pedestrian.

BACKGROUND

Navigation technology is widely used in our daily life. Navigation of routes from an origin to a destination, users can drive or walk by navigating through a map application. However, for the visually impaired, although walking is assisted by blind tracks laid on the roads, lack of navigation when actual walking, such as the presence of obstacles on the road, may be problematic for the visually impaired.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
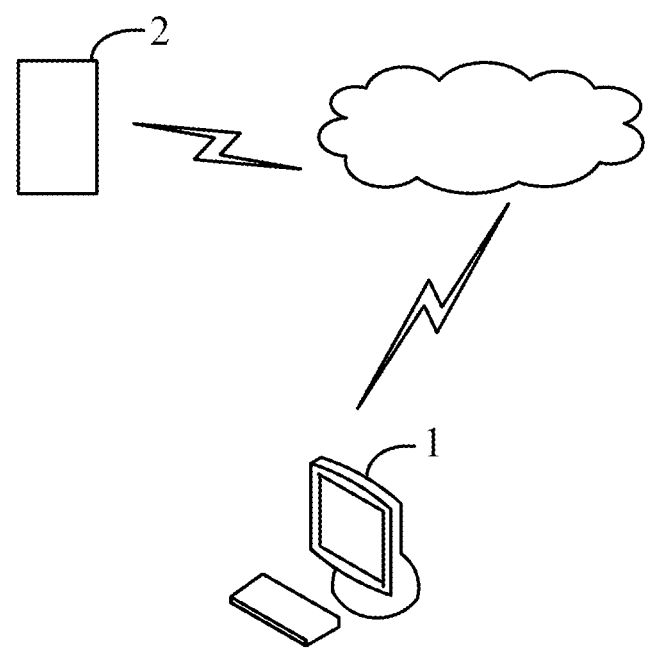
FIG. 1 is a schematic view of an embodiment of an application environment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device (electronic device 1) is illustrated. The electronic device 1 communicates with at least one mobile device 2 through a network. The network can be a wired network or a wireless network. The wireless network can be WI-FI or a cellular network. The cellular network can be a 4G network or a 5G network.

In one embodiment, the electronic device 1 can be a personal computer, a server, and the like, the server can be a single server, a server cluster, or a cloud server. The mobile device 2 can be a smart phone, a tablet computer, or a smart wearable device.

The electronic device 1 includes, but is not limited to, a processor 10, a storage device 20, a computer program 30, and a number of image capturing devices 40. The computer program 30 may be executed by the processor 10 to implement a method for navigating pedestrian. FIG. 1 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The image capturing device 40 can be a camera device. The image capturing device 40 is arranged on the road, and captures images of a road environment.

Figure 2:
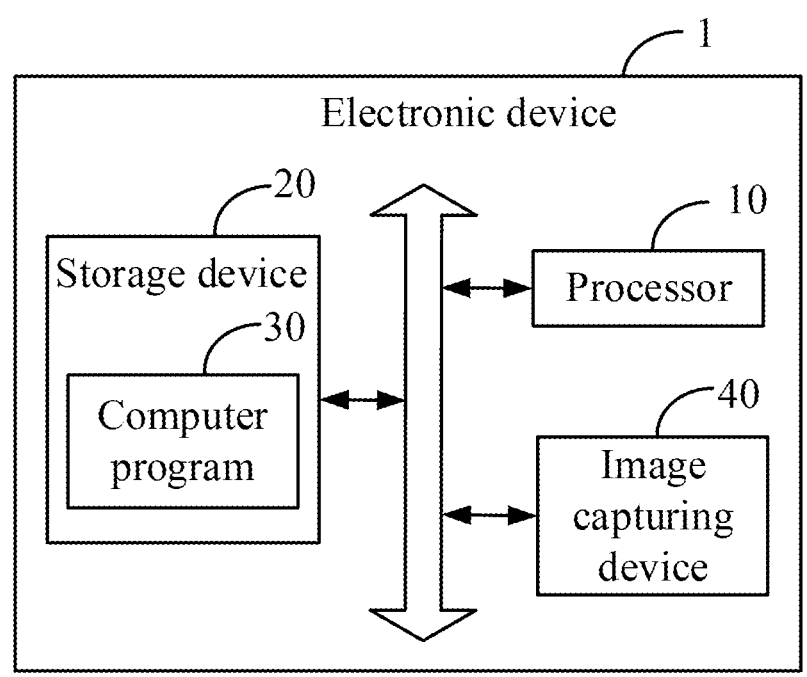
FIG. 2 is a block diagram of an embodiment of an electronic device according to the present disclosure.
Figure 3:
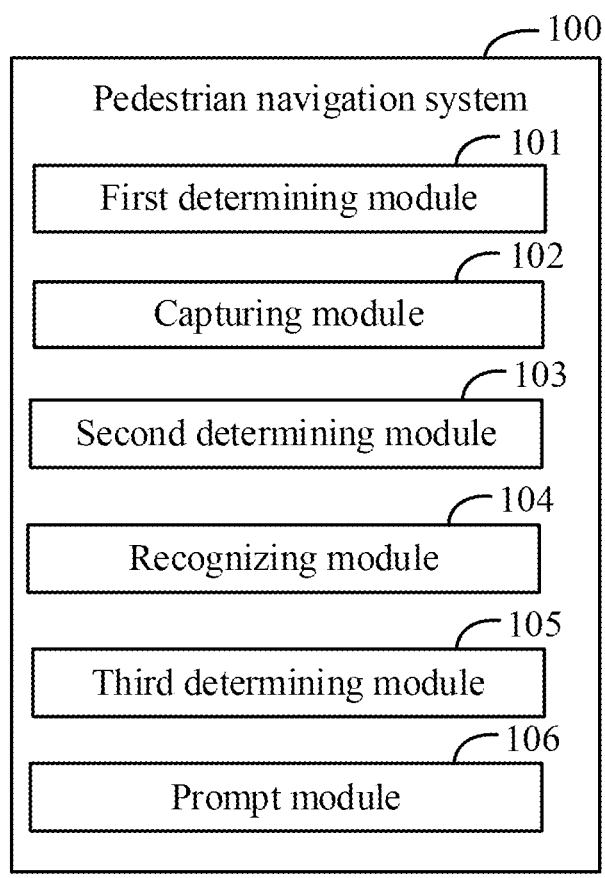
FIG. 3 is a block diagram of an embodiment of an image recognition system operating in an electronic device according to the present disclosure.

As illustrated in FIG. 2, the electronic device 1 runs a pedestrian navigation system 100. The pedestrian navigation system 100 at least includes a first determining module 101, a capturing module 102, a second determining module 103, a recognizing module 104, a third determining module 105, and a prompt module 106. The modules 101-106 can be collections of software instructions stored in the storage device 20 of the electronic device 1 and executed by the processor 10. The modules 101-106 also can include functionality represented by hardware or integrated circuits, or by software and hardware combinations, such as a special-purpose processor or a general-purpose processor with special-purpose firmware.

The first determining module 101 is configured to determine the image capturing device 40 which is closest to the mobile device 2 when the electronic device 1 receives a navigation request from the mobile device 2.

In one embodiment, when the electronic device 1 receives the navigation request from the mobile device 2, the first determining module 101 determines the location information of the mobile device 2, calculates distances between the number of image capturing devices 40 and the mobile device 2 according to the location information, and then determines the image capturing device 40 which is closest to the mobile device 2 according to the calculated distances.

If a distance between an image capturing device 40 and the mobile device 2 is the shortest distance of the calculated distances, the image capturing device 40 is determined to be closest to the mobile device 2.

In other embodiments, when the electronic device 1 receives the navigation request from the mobile device 2, the first determining module 101 determines the location information of the mobile device 2, determines the road where the mobile terminal 2 is located according to the location information, determines the presence or absence of at least one image capturing device 40 arranged on the road, calculates the distance between the at least one image capturing device 40 and the mobile device 2, and then determines the image capturing device 40 which is closest to the mobile device 2 according to the calculated distance.

In response to the navigation request from the mobile device 2, the capturing module 102 is configured to capture the images of an environment of the road where the mobile device 2 is located at preset time intervals.

In one embodiment, the capturing module 102 controls the image capturing device 40 which is closest to the mobile device 2 to capture the images of an environment of the road where the mobile device 2 is located. In one embodiment, the preset time interval can be 0.5 seconds. In other embodiments, the preset time interval can also be set to other suitable time according to requirements.

The second determining module 103 is configured to determine whether at least one first obstacle exists on the road according to the captured images.

In one embodiment, the second determining module 103 segments each of the captured images according to a Fully Convolutional Network algorithm (FCN) and a Conditional Random Field algorithm (CRF).

In detail, the second determining module 103 normalizes each of the captured image, then inputs the normalized captured image into an FCN network, and obtains multiple feature values through a convolution and maximum pooling processes. The width and height of the output image are $\frac{1}{32}$ of the width and height of the initial input image, the second determining module 103 further obtains upsampled features by upsampling the feature values, and obtains a segmented image corresponding to each of the captured images by inputting each upsampled feature into a logistic regression prediction (softmax prediction) function. Then, the second determining module 103 inputs the segmented image into a CRF model to optimize the segmented image. In one embodiment, the segmented image includes the outline of each object in the captured image.

In one embodiment, the second determining module 103 further determines whether the segmented image includes contours of objects other than a contours of the road. In detail, the second determining module 103 determines whether the segmented image includes the contours of objects other than the contours of the road by contour feature identification.

In one embodiment, when the second determining module 103 determines that the segmented image includes the contours of objects other than the contours of the road, it is determined that the first obstacle exists on the road. When the second determining module 103 determines that the segmented image does not include the contours of objects other than the contours of the road, it is determined that no first obstacles exists on the road. In one embodiment, the first obstacle may be an obviously visible obstacle.

The recognizing module 104 is configured to recognize a category of the first obstacle when the second determining module 103 determines that the at least one first obstacle exists on the road.

In one embodiment, the category can be a generic name of the first obstacle, such as street light poles, billboards, transformer boxes, bus stop sign supports, and the like.

The recognizing module 104 is further configured to recognize pedestrians in the captured images, and determine a movement track of each pedestrian.

In one embodiment, the pedestrians are the persons other than the user on the road. The recognizing module 104 recognizes the pedestrians in each image according to a target detection algorithm. In one embodiment, the target detection algorithm may be a MobileNet-SSD model, the MobileNet-SSD model may be a pre-trained model. The recognizing module 104 inputs the captured images into the MobileNet-SSD model, so that the pedestrians in each image can be recognized by the MobileNet-SSD model. In other embodiments, the target detection algorithm may also be a YOLOv3 model.

In one embodiment, the recognizing module 104 further marks each pedestrian in each image with the head as a reference, the position of the head of the pedestrian represents the position of the pedestrian, and generates the movement track of each pedestrian according to positional changes of the head of the pedestrian in the number of captured images.

The second determining module 103 is further configured to determine whether each pedestrian is walking in a single direction according to the movement track of each pedestrian.

Figure 4:
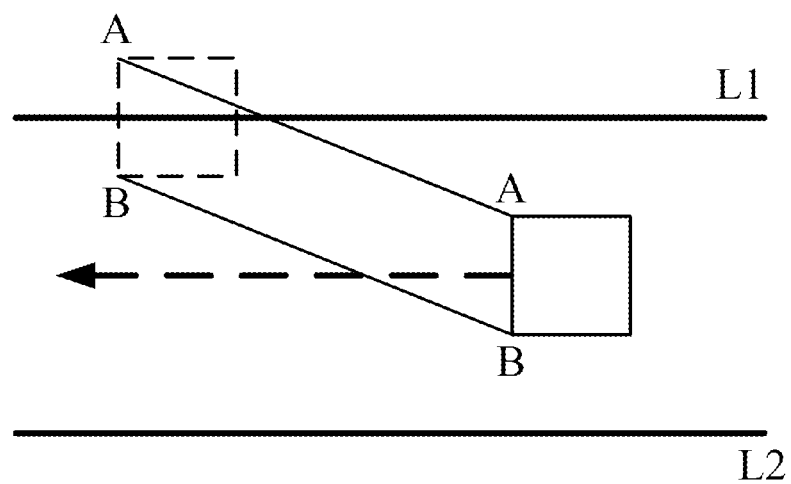
FIG. 4 is a schematic diagram of an embodiment of a movement track of a pedestrian according to the present disclosure.

Referring to FIG. 4, in a first embodiment, the second determining module 103 determines a preset walking path of each pedestrian according to an orientation of each pedestrian in a first image of the captured images, and sets two threshold lines located on both sides of the preset walking path and the head of the pedestrian in the captured images. The two threshold lines are set based on the head position of pedestrian, one threshold line is located near the top of the head, and the other threshold line is located near the bottom of the head. In FIG. 4, a box is used to indicate the head of the pedestrian, an arrow is used to indicate the preset walking path of the pedestrian, and two solid lines are used to indicate the threshold line.

The second determining module 103 further selects two reference points on the head of the pedestrian in the image, such as reference points A and B in FIG. 4. The second determining module 103 further determines whether two lines between the same reference points in any two images of the captured images intersect with at least one of the two threshold lines, that is, whether the line between two reference points A or the line between two reference points B in FIG. 4 intersect with the threshold line. When it is determined that at least one line between the same reference points in any two images intersects the threshold line, the second determining module 103 determines that the pedestrian is deviating from the single direction of walking. When it is determined that the two lines between the same reference points in any two images do not intersect any threshold line, the second determining module 103 determines that the pedestrian is walking in the single direction.

Figure 5:
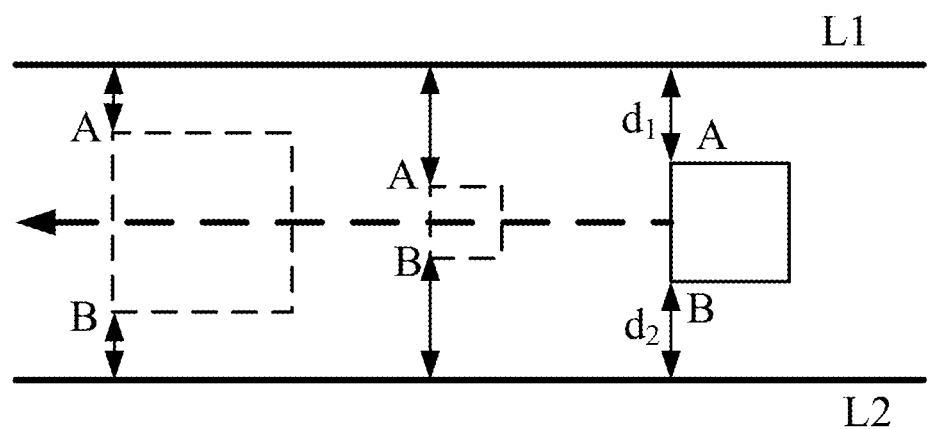
FIG. 5 is a schematic diagram of another embodiment of the movement track of the pedestrian according to the present disclosure.

Referring to FIG. 5, in a second embodiment, the second determining module 103 determines a preset walking path of the pedestrian according to the orientation of the pedestrian in the captured first image, and sets two threshold lines located on both sides of the preset walking path and the head of the pedestrian. The two threshold lines are set based on the head position of pedestrians, one threshold line is located near the top of the head, and the other threshold line is located near the bottom of the head. In FIG. 5, a box is used to indicate the head of a pedestrian, an arrow parallel to the threshold line is used to indicate the preset path of a pedestrian, and two solid lines are used to indicate the threshold line.

The second determining module 103 further selects two reference points on the head of the pedestrian in the image, such as reference points A and B in FIG. 5. The second determining module 103 further calculates a first sum of first distances between each of the two reference points and an adjacent threshold line in the first image, and calculates a second sum of distances between each of the two reference points and an adjacent threshold line in another captured image.

In one embodiment, equation $$2d = 2 * \frac{|ax_1 + by_1 + c|}{\sqrt{a^2 + b^2}} \qquad \text{(equation (1))}$$

is used for calculating the first sum of the distances and the second sum of the distances by the second determining module 103. In the equation, the sum of the distances 2d=d1+d2, ax+by+c=0 (equation (2)) is a straight line equation of the threshold line, and (x1, y1) is the coordinate of A or B in a coordinate system of the image. For example, d1 is a distance between the reference point A and the upper threshold line L1, d2 is a distance between the reference point B and the lower threshold line L2.

In detail, the second determining module 103 determines whether the pedestrian is moving away from or approaching the image capturing device 40 according to the image. For example, when the second determining module 103 determines that the image includes the pedestrian's face, it is determined that the pedestrian is approaching the image capturing device 40. When the second determining module 103 determines that the image does not include the pedestrian's face, it is determined that the pedestrian is moving away from the image capturing device 40. When it is determined that the pedestrian is moving away from the image capturing device 40, the second determining module 103 determines whether the first sum of the distances is less than the second sum of the distances. When the first sum of distances is less than the second sum of the distances, the second determining module 103 determines that the pedestrian is walking in the single direction. When the first sum of the distances is greater than or equal to the second sum of the distances, the second determining module 103 determines that the pedestrian is deviating from the single direction.

When it is determined that the pedestrian is approaching the image capturing device 40, the second determining module 103 determines whether the first sum of the distances is greater than the second sum of the distances. When the first sum of the distances is greater than the second sum of the distances, the second determining module 103 determines that the pedestrian is walking in the single direction. When the first sum of the distances is less than or equal to the second sum of the distances, the second determining module 103 determines that the pedestrian is deviating from the single direction.

The third determining module 105 is configured to determine that at least one second obstacle exists on the road when the pedestrian is deviating from the single direction. The third determining module 105 is further configured to determine that no second obstacle exists on the road when the pedestrian is walking in the single direction. In one embodiment, the second obstacle may be a hidden obstacle, such as a pothole or the like.

The prompting module 106 is configured to transmit an obstacle avoidance prompt to the mobile device 2 when it is determined that the first obstacle and/or the second obstacle exist on the road.

In one embodiment, the obstacle avoidance prompt can include the category of the first obstacle, and the positions of the first obstacle and/or the second obstacle relative to the mobile device 2, that is, relative to the user.

Further, when it is determined that the first obstacle and/or the second obstacle exist on the road, the second determining module 103 determines whether the first obstacle and/or the second obstacle are located on the path of the user carrying the mobile device 2. When it is determined that the first obstacle and/or the second obstacle are located on the current path of the user carrying the mobile device 2, the obstacle avoidance prompt is transmitted to the mobile device 2.

Figure 6:
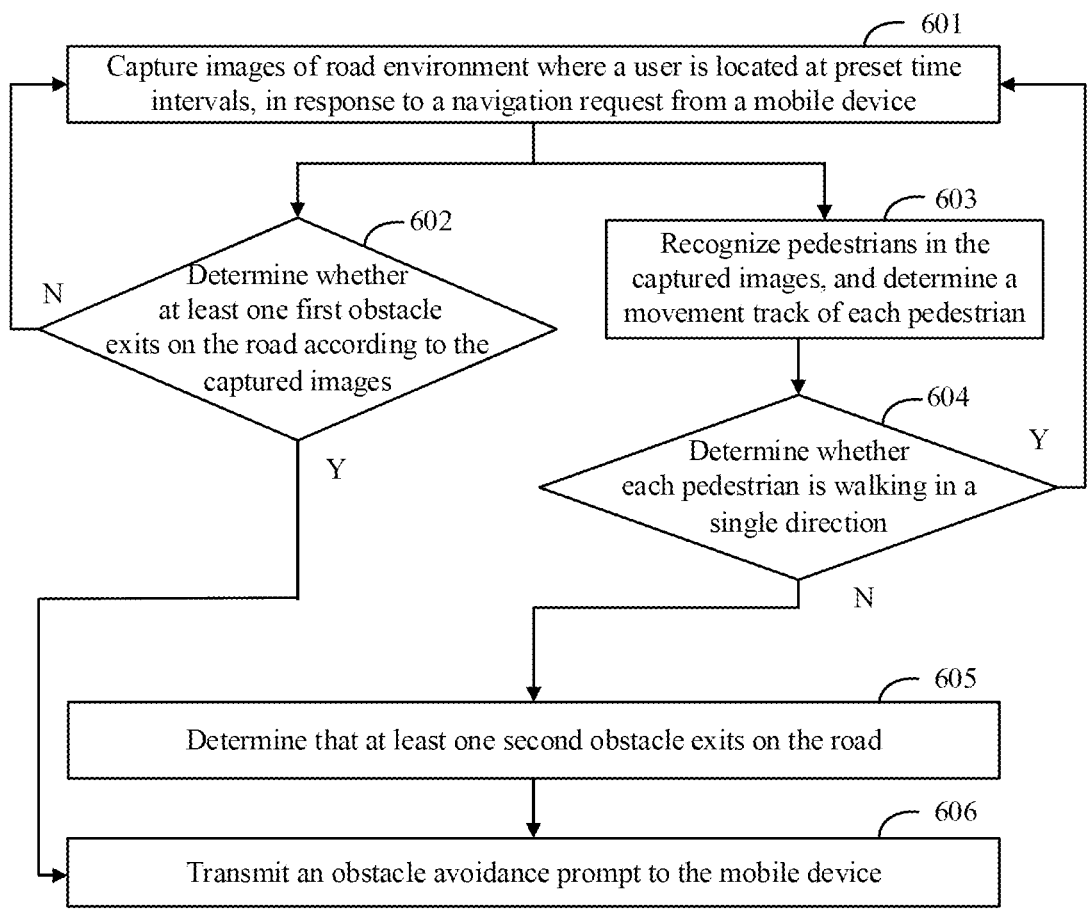
FIG. 6 illustrates a flowchart of an embodiment of a method of navigating pedestrian according to the present disclosure.

FIG. 6 illustrates a flowchart of an embodiment of a method for navigating pedestrian. The method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 601.

The first determining module 101 determines an image capturing device 40 which is closest to the mobile device 2 when the electronic device 1 receives a navigation request from the mobile device 2.

In one embodiment, when the electronic device 1 receives the navigation request from the mobile device 2, the first determining module 101 determines the location information of the mobile device 2, calculates distances between the number of image capturing devices 40 and the mobile device 2 according to the location information, and then determines the image capturing device 40 which is closest to the mobile device 2 according to the calculated distances.

If a distance between an image capturing device 40 and the mobile device 2 is the shortest distance of the calculated distances, the image capturing device 40 is determined to be closest to the mobile device 2.

In other embodiments, when the electronic device 1 receives the navigation request from the mobile device 2, the first determining module 101 determines the location information of the mobile device 2, determines the road where the mobile terminal 2 is located according to the location information, determines the presence or absence of at least one image capturing device 40 arranged on the road, calculates the distance between the at least one image capturing device 40 and the mobile device 2, and then determines the image capturing device 40 which is closest to the mobile device 2 according to the calculated distance.

At block 601, the capturing module 102 captures images of an environment of the road where the mobile device 2 is located at preset time intervals, in response to the navigation request from the mobile device 2.

In one embodiment, the capturing module 102 controls the image capturing device 40 which is closest to the mobile device 2 to capture the images of the road where the user is located. In one embodiment, the preset time interval can be 0.5 seconds. In other embodiments, the preset time interval can also be set to other suitable time according to requirements.

At block 602, the second determining module 103 determines whether at least one first obstacle exists on the road according to the captured images.

In one embodiment, the second determining module 103 segments each of the captured images according to a Fully Convolutional Network algorithm (FCN) and a Conditional Random Field algorithm (CRF).

In detail, the second determining module 103 normalizes each of the captured image, then inputs the normalized captured image into an FCN network, and obtains multiple feature values through a convolution and maximum pooling processes. The width and height of the output image are $\frac{1}{32}$ of the width and height of the initial input image, the second determining module 103 further obtains upsampled features by upsampling the feature values, and obtains a segmented image corresponding to each of the captured images by inputting each upsampled feature into a logistic regression prediction (softmax prediction) function. Then, the second determining module 103 inputs the segmented image into a CRF model to optimize the segmented image. In one embodiment, the segmented image includes the outline of each object in the captured image.

In one embodiment, the second determining module 103 further determines whether the segmented image includes contours of objects other than a contours of the road. In detail, the second determining module 103 determines whether the segmented image includes the contours of objects other than the contours of the road by contour feature identification.

In one embodiment, when the second determining module 103 determines that the segmented image includes the contours of objects other than the contours of the road, it is determined that the first obstacle exists on the road. When the second determining module 103 determines that the segmented image does not include the contours of objects other than the contours of the road, it is determined that no first obstacles exists on the road. In one embodiment, the first obstacle may be an obviously visible obstacle.

In one embodiment, the recognizing module 104 recognizes a category of the first obstacle when the second determining module 103 determines that the at least one first obstacle exists on the road.

In one embodiment, the category can be a generic name of the first obstacle, such as street light poles, billboards, transformer boxes, bus stop sign supports, and the like.

At block 603, the recognizing module 104 recognizes pedestrians in the captured images, and determine a movement track of each pedestrian.

In one embodiment, the pedestrians are the persons other than the user on the road. The recognizing module 104 recognizes the pedestrians in each image according to a target detection algorithm. In one embodiment, the target detection algorithm may be a MobileNet-SSD model, the MobileNet-SSD model may be a pre-trained model. The recognizing module 104 inputs the captured images into the MobileNet-SSD model, so that the pedestrians in each image can be recognized by the MobileNet-SSD model. In other embodiments, the target detection algorithm may also be a YOLOv3 model.

In one embodiment, the recognizing module 104 further marks each pedestrian in each image with the head as a reference, the position of the head of the pedestrian represents the position of the pedestrian, and generates the movement track of each pedestrian according to positional changes of the head of the pedestrian in the number of captured images.

At block 604, the second determining module 103 further determines whether each pedestrian is walking in a single direction according to the movement track of each pedestrian.

Referring to FIG. 4, in a first embodiment, the second determining module 103 determines a preset walking path of each pedestrian according to an orientation of each pedestrian in a first image of the captured images, and sets two threshold lines located on both sides of the preset walking path and the head of the pedestrian in the captured images. The two threshold lines are set based on the head position of pedestrian, one threshold line is located near the top of the head, and the other threshold line is located near the bottom of the head. In FIG. 4, a box is used to indicate the head of the pedestrian, an arrow is used to indicate the preset walking path of the pedestrian, and two solid lines are used to indicate the threshold line.

The second determining module 103 further selects two reference points on the head of the pedestrian in the image, such as reference points A and B in FIG. 4. The second determining module 103 further determines whether two lines between the same reference points in any two images of the captured images intersect with at least one of the two threshold lines, that is, whether the line between two reference points A or the line between two reference points B in FIG. 4 intersect with the threshold line. When it is determined that at least one line between the same reference points in any two images intersects the threshold line, the second determining module 103 determines that the pedestrian is deviating from the single direction of walking. When it is determined that the two lines between the same reference points in any two images do not intersect any threshold line, the second determining module 103 determines that the pedestrian is walking in the single direction.

Referring to FIG. 5, in a second embodiment, the second determining module 103 determines a preset walking path of the pedestrian according to the orientation of the pedestrian in the captured first image, and sets two threshold lines located on both sides of the preset walking path and the head of the pedestrian. The two threshold lines are set based on the head position of pedestrians, one threshold line is located near the top of the head, and the other threshold line is located near the bottom of the head. In FIG. 5, a box is used to indicate the head of a pedestrian, an arrow parallel to the threshold line is used to indicate the preset path of a pedestrian, and two solid lines are used to indicate the threshold line.

The second determining module 103 further selects two reference points on the head of the pedestrian in the image, such as reference points A and B in FIG. 5. The second determining module 103 further calculates a first sum of first distances between each of the two reference points and an adjacent threshold line in the first image, and calculates a second sum of distances between each of the two reference points and an adjacent threshold line in another captured image.

In one embodiment, equation $$2d = 2 * \frac{|ax_1 + by_1 + c|}{\sqrt{a^2 + b^2}} \qquad \text{(equation (1))}$$

is used for calculating the first sum of the distances and the second sum of the distances by the second determining module 103. In the equation, the sum of the distances 2d=d1+d2, ax+by+c=0 (equation (2)) is a straight line equation of the threshold line, and (x1, y1) is the coordinate of A or B in a coordinate system of the image. For example, d1 is a distance between the reference point A and the upper threshold line L1, d2 is a distance between the reference point B and the lower threshold line L2.

In detail, the second determining module 103 determines whether the pedestrian is moving away from or approaching the image capturing device 40 according to the image. For example, when the second determining module 103 determines that the image includes the pedestrian's face, it is determined that the pedestrian is approaching the image capturing device 40. When the second determining module 103 determines that the image does not include the pedestrian's face, it is determined that the pedestrian is moving away from the image capturing device 40. When it is determined that the pedestrian is moving away from the image capturing device 40, the second determining module 103 determines whether the first sum of the distances is less than the second sum of the distances. When the first sum of distances is less than the second sum of the distances, the second determining module 103 determines that the pedestrian is walking in the single direction. When the first sum of the distances is greater than or equal to the second sum of the distances, the second determining module 103 determines that the pedestrian is deviating from the single direction.

When it is determined that the pedestrian is approaching the image capturing device 40, the second determining module 103 determines whether the first sum of the distances is greater than the second sum of the distances. When the first sum of the distances is greater than the second sum of the distances, the second determining module 103 determines that the pedestrian is walking in the single direction. When the first sum of the distances is less than or equal to the second sum of the distances, the second determining module 103 determines that the pedestrian is deviating from the single direction.

At block 605, the third determining module 105 determines that there is at least one second obstacle on the road when the pedestrian is deviating from the straight and single direction.

The third determining module 105 further determines that there is no second obstacle on the road when the pedestrian keeps walking in the single direction. In one embodiment, the second obstacle can be a hidden obstacle, such as a pothole or the like.

At block 606, the prompting module 106 transmits an obstacle avoidance prompt to the mobile device 2 when it is determined that the first obstacle and/or the second obstacle exist on the road.

In one embodiment, the obstacle avoidance prompt includes the category of the first obstacle, and the positions of the first obstacle and/or the second obstacle relative to the mobile device 2, that is, relative to the user.

Further, when it is determined that the first obstacle and/or the second obstacle exist on the road, the second determining module 103 determines whether the first obstacle and/or the second obstacle are located on the path of the user. If it is determined that the first obstacle and/or the second obstacle are located on the current path of the user, the obstacle avoidance prompt is transmitted to the mobile device 2.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor; and
   a storage device coupled to the at least one processor and storing instructions for execution by the at least one processor to cause the at least one processor to:
   in response to a navigation request from a mobile device, capture images of an environment of a road where the mobile device is located at preset time intervals;
   determine whether at least one first obstacle exists on the road according to the captured images;
   recognize pedestrians in each of the captured images, and determine a movement track of each of the pedestrians;
   recognize the pedestrians in each of the captured image by applying a target detection algorithm;
   mark each of the pedestrians in each of the captured image with a head as a reference;
   generate the movement track of each of the pedestrians according to positional changes of the head of each of the pedestrians in the captured images;
   determine whether each of the pedestrians is walking in a single direction according to the movement track of each of the pedestrians;
   determine that at least one second obstacle exists on the road in response that at least one of the pedestrians is deviating from the single direction; and
   transmit an obstacle avoidance prompt to the mobile device in response that the first obstacle and/or the second obstacle exist on the road.

2. The electronic device according to claim 1, wherein the at least one processor is further caused to:
   in response that the first obstacle and/or the second obstacle exist on the road, determine whether the first obstacle and/or the second obstacle is located on a path of a user carrying the mobile device; and in response that the first obstacle and/or the second obstacle is located on the path of the user, transmit an obstacle avoidance prompt to the mobile device.

3. The electronic device according to claim 1, wherein the at least one processor is further caused to:
segment each of the captured images according to a Fully Convolutional Network algorithm and a Conditional Random Field algorithm;
determines whether at least one of the segmented images includes contours of objects other than a contour of the road;
in response that the segmented image includes the contours of the objects other than the contours of the road, determine that the first obstacle exists on the road; and
in response that the segmented image does not include the contours of the objects other than the contour of the road, determine that no first obstacle exists on the road.

4. The electronic device according to claim 3, wherein the at least one processor is further caused to:
recognize a category of the first obstacle in response that the first obstacle exists on the road, wherein the obstacle avoidance prompt comprises the category of the first obstacle.

5. The electronic device according to claim 1, wherein the at least one processor is further caused to:
determine a preset walking path of each of the pedestrians according to an orientation of each of the pedestrians in a first image of the captured images;
set two threshold lines located on both sides of the preset walking path and the head of the pedestrian in the captured images;
select two reference points on the head of the pedestrian in the captured images;
determine whether two lines between same reference points in any two images of the captured images intersect with at least one of the two threshold lines;
in response that at least one line between the same reference points in any two images of the captured images intersects the at least one of the two threshold lines, determine that the pedestrian is deviating from the single direction; and
in response that the two lines between the same reference points in any two images of the captured images do not intersect any threshold line, determine that the pedestrian is walking in the single direction.

6. The electronic device according to claim 1, wherein the at least one processor is further caused to:
determine a preset walking path of each of the pedestrians according to an orientation of each of the pedestrians in a first captured image of the captured images;
set two threshold lines located on both sides of the preset walking path and the head of the pedestrian in the captured images;
select two reference points on the head of the pedestrian in the captured images;
calculate a first sum of first distances between each of the two reference points and an adjacent threshold line in the first image;
calculate a second sum of distances between each of the two reference points and an adjacent threshold line in another captured image;
determine whether the sum of the first distances is less than the sum of the second distances;
in response that the first sum of the distances is less than the second sum of the distances, determine that the pedestrian is walking in the single direction; and in response that the first sum of the distances is greater than or equal to the second sum of the distances, determine that the pedestrian is deviating from the single direction.

7. The electronic device according to claim 1, wherein the at least one processor is further caused to:
determine an image capturing device which is closest to the mobile device in response that the electronic device receives the navigation request from the mobile device; and
control the image capturing device which is closest to the mobile device to capture the images of the environment the road where the mobile device is located at the preset time intervals.

8. A method for navigating pedestrian implemented in an electronic device comprising:
capturing images of an environment of a road where a mobile device is located at preset time intervals in response to a navigation request from the mobile device;
determining whether at least one first obstacle exists on the road according to the captured images;
recognizing pedestrians in each of the captured images, and determining a movement track of each of the pedestrians, comprising: recognizing the pedestrians in each of the captured image by applying a target detection algorithm, marking each of the pedestrians in each of the captured image with a head as a reference; and generating the movement track of each of the pedestrians according to positional changes of the head of each of the pedestrians in the captured images;
determining whether each of the pedestrians is walking in a single direction according to the movement track of each of the pedestrians;
determining that at least one second obstacle exists on the road in response that at least one of the pedestrians is deviating from the single direction; and
transmitting an obstacle avoidance prompt to the mobile device in response that the first obstacle and/or the second obstacle exist on the road.

9. The method according to claim 8, further comprising:
determining whether the first obstacle and/or the second obstacle is located on a path of a user carrying the mobile device, in response that the first obstacle and/or the second obstacle exist on the road; and
in response that the first obstacle and/or the second obstacle is located on the path of the user, transmitting an obstacle avoidance prompt to the mobile device.

10. The method according to claim 8, wherein determining whether at least one first obstacle exists on the road according to the captured images comprises:
segment each of the captured images according to a Fully Convolutional Network algorithm and a Conditional Random Field algorithm;
determines whether at least one of the segmented images includes contours of objects other than a contour of the road;
determine that the first obstacle exists on the road, in response that the segmented image includes the contours of the objects other than the contours of the road; and
determine that no first obstacle exists on the road, in response that the segmented image does not include the contours of the objects other than the contours of the road.

11. The method according to claim 10, further comprising:

recognizing a category of the first obstacle in response that the first obstacle exists on the road, wherein the obstacle avoidance prompt comprises the category of the first obstacle.

12. The method according to claim 8, wherein determining whether each of the pedestrians is walking in a single direction according to the movement track of each of the pedestrians comprises:
- determining a preset walking path of each of the pedestrians according to an orientation of each of the pedestrians in a first captured image of the captured images;
- setting two threshold lines located on both sides of the preset walking path and the head of the pedestrian in the captured images;
- selecting two reference points on the head of the pedestrian in the captured images;
- determining whether two lines between same reference points in any two images of the captured images intersect with at least one of the two threshold lines;
- determining that the pedestrian is deviating from the single direction, in response that at least one line between the same reference points in any two images of the captured images intersects the at least one of the two threshold lines; and
- determining that the pedestrian is walking in the single direction, in response that the two lines between the same reference points in any two images of the captured images do not intersect any threshold line.

13. The method according to claim 8, wherein determining whether each of the pedestrians is walking in a single direction according to the movement track of each of the pedestrians comprises:
- determining a preset walking path of each of the pedestrians according to an orientation of each of the pedestrians in a first captured image of the captured images;
- setting two threshold lines located on both sides of the preset walking path and the head of the pedestrian in the captured images;
- selecting two reference points on the head of the pedestrian in the captured images;
- calculating a first sum of first distances between each of the two reference points and an adjacent threshold line in the first image;
- calculating a second sum of distances between each of the two reference points and an adjacent threshold line in another captured image;
- determining whether the sum of the first distances is less than the sum of the second distances;
- determining that the pedestrian is walking in the single direction, in response that the first sum of the distances is less than the second sum of the distances; and
- determining that the pedestrian is deviating from the single direction, in response that the first sum of the distances is greater than or equal to the second sum of the distances.

14. The method according to claim 8, wherein capturing images of an environment of a road where a mobile device is located at preset time intervals comprises:
- determining an image capturing device which is closest to the mobile device in response that the electronic device receives the navigation request from the mobile device; and
- controlling the image capturing device which is closest to the mobile device to capture the images of the environment of the road where the mobile device is located at the preset time intervals.

* * * * *